US005799919A

United States Patent [19]
Orr

[11] Patent Number: 5,799,919
[45] Date of Patent: Sep. 1, 1998

[54] ADJUSTABLE STAND

[76] Inventor: Marjorie Orr, 104 Ashford Ave., Greenville, S.C. 29609

[21] Appl. No.: 550,486

[22] Filed: Oct. 30, 1995

[51] Int. Cl.$^6$ ..................................................... F16M 13/00
[52] U.S. Cl. ............................................. 248/398; 248/514
[58] Field of Search ..................................... 248/398, 397, 248/456, 447, 514, 516, 149, 219.3, 223.41, 225.11

[56] References Cited

U.S. PATENT DOCUMENTS

| | | | |
|---|---|---|---|
| 135,924 | 2/1873 | Lyon | 248/398 X |
| 1,789,509 | 1/1931 | Bergstrom | 248/516 |
| 2,481,272 | 9/1949 | Williams | 248/514 |
| 3,191,898 | 6/1965 | McCullough | 248/514 |
| 3,309,803 | 3/1967 | Wilson | 248/397 X |
| 4,074,656 | 2/1978 | Haapala | 248/397 X |
| 5,374,024 | 12/1994 | Williams | 248/514 |

OTHER PUBLICATIONS

Gruber's Market Brochure Sep. 1, 1995 (1 page) advertising a lap quilt Game.
The Country Quilter Brochure 1993 (1 page) advertising a border and standing Hoop.
Sullivan's Woodworks Brochure Jan. 1, 1995 (3 pages) advertising several quilt Games.

*Primary Examiner*—Ramon O. Ramirez
*Assistant Examiner*—Long Dinh Phan
*Attorney, Agent, or Firm*—Hardaway Law Firm, P.A.

[57] ABSTRACT

An adjustable stand includes an upright carried by a base which facilitates movement along an arcuate path from a vertical position to a horizontal position with a series of intervening lockable positions. The upper end of the upright provides a ball and socket attachment by which an article such as a quilting hoop may be carried and positioned. The operation of the adjustable stand allows force applied to the hoop to be used to vary the position of both the stand and the article relative to the stand.

6 Claims, 3 Drawing Sheets

ADJUSTABLE STAND

BACKGROUND OF INVENTION

This invention is directed towards an adjustable stand. A specific embodiment of the invention is directed towards an adjustable quilting stand. While a variety of prior art stands for quilting are known in the art, the prior art disrupts the quilting process in order to make adjustments with respect to the stand height, the position of a quilting ring, or adjustment of the stand relative to the user. Accordingly, there is room for improvement and variation within the art of adjustable stands.

OBJECTS OF THE INVENTION

It is an object of this invention to provide a stand which pivots about a base of the stand.

It is a further and more particular object of this invention to provide a stand having adjustable height and work angles all of which are adjustable by the manipulation of a terminal article carried by the stand.

It is a further and more particular object of this invention to provide a stand which folds about its base for compact storage and shipping.

It is a further and more particular object of this invention to provide an adjustable stand having preset angle adjustments which are responsive to a slight upward movement of an upright relative to a base.

These and other objects of this invention are provided by an adjustable stand comprising a horizontal base; a boot defining a three-sided receptacle carried by an upper surface of the base, the boot further defining a first sidewall, a second sidewall, and a back, the back connecting the first sidewall to the second sidewall; a first plate attached to an inner surface of the first sidewall, the first plate defining a series of notches along a portion of an arcuate edge of the plate, the arcuate edge and the notches opposite a groove defined by an inner surface of the first sidewall; a second plate attached to an inner surface of the second sidewall, the second plate defining the series of notches along a portion of an arcuate edge of the second plate, the arcuate edge and the notches being opposite a groove defined by an inner surface of the second sidewall; an upright defining a rectangular post of a first end, the post carried within the receptacle by an anchor pin traversing the post through a chamber defined by the post, each the end of the anchor pin mounted within a respective bore defined by an interior wall of each sidewall, the chamber having a height dimension along a vertical axis set upright, the height dimension greater than a diameter of the anchor pin; a locking pin traversing the post at a position above the anchor pin, a first end of the locking pin selectively engaging the notches and the arcuate surface of the first plate, and a second end of the locking pin selectively engaging the notches and the arcuate surface of the second plate; a terminal ball carried on a free end of the upright; a first frame defining a circular aperture diameter therethrough, the aperture less than the diameter of the terminal ball and in communication through the aperture with a lower hemisphere of the ball; a second frame defining an aperture therethrough, the aperture having a diameter less than the aperture of the first frame and carried by an upper surface of the first frame by a plurality of spaced connectors, the second frame aperture being in communication with a portion of an upper hemisphere of the ball; an article having a mated base for engaging surface of the second frame, the base further defining a securing member for attaching the mated base to the second frame.

DETAILED DESCRIPTION OF THE DRAWINGS

As seen in reference to the accompanying figures, an adjustable stand is provided. As illustrated, a preferred embodiment of the invention provides for an attached article of a quilting hoop. While the detailed description is given in reference to the preferred embodiment, it is understood that the article carried by the stand could include a holder for sheet music, an article holder suitable for use as a podium or speaking stand, a microphone stand, a reading stand, a quilting stand, scroll frame stand, as well as a useful display stand for a document such as a Bible, globe, or writing surface.

Figure 1:
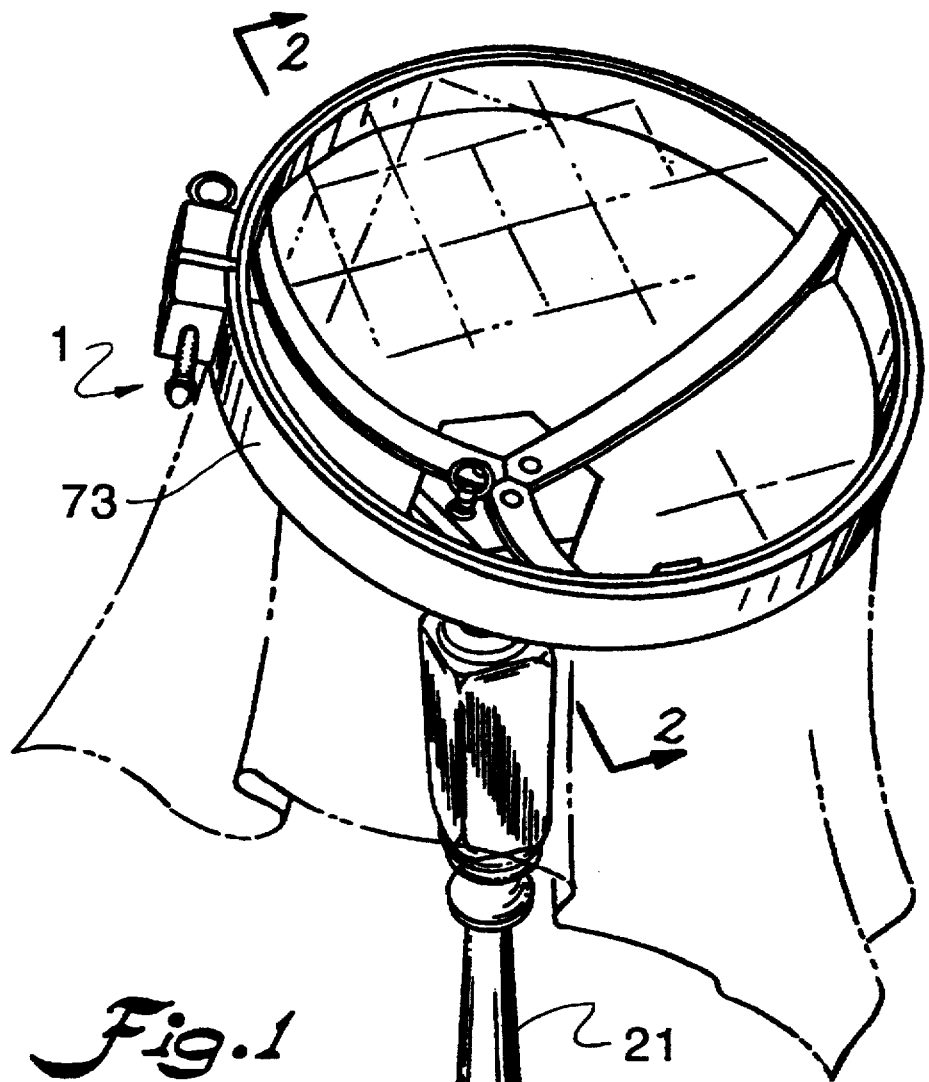
FIG. 1 is a perspective view of a preferred embodiment of this invention.

As seen in FIG. 1, adjustable stand 1 comprises an oval wooden base 3. Mounted to base 3 is a boot 5 further comprising a pair of opposite wood side boards 7 and 9 which are connected along a rear by a back or stop 11. A pair of braces 10 reinforces side walls 7 and 9. A receptacle 15 is defined in an interior of boot 5. An wooden upright 21 preferably has a rectangular end portion 23 part of which is positioned inside receptacle 15. End portion 23 further defines a rectangular notch 31 (FIG. 4) therethrough. Traversing notch 31 is an anchor pin 41 having an end portion of each terminus of anchor pin 41 residing within the boot such as within an aperture defined within an interior sidewall 7 and 9 of boot 5. As illustrated, notch 31 is defined along an axis of upright 21 and permits movement of upright 21 in the direction of its axis relative to anchor pin 41. A second locking pin 43 also traverses rectangular end 23 at a position above anchor pin 41. Each terminus of pin 43 projects slightly beyond the upright and into a groove 53 or other recess defined by an inner surface of each sidewall 7 and 9. While a single pin 43 is preferred, an equivalent structure could be provided by two separate and independent locking pins.

Figure 4:
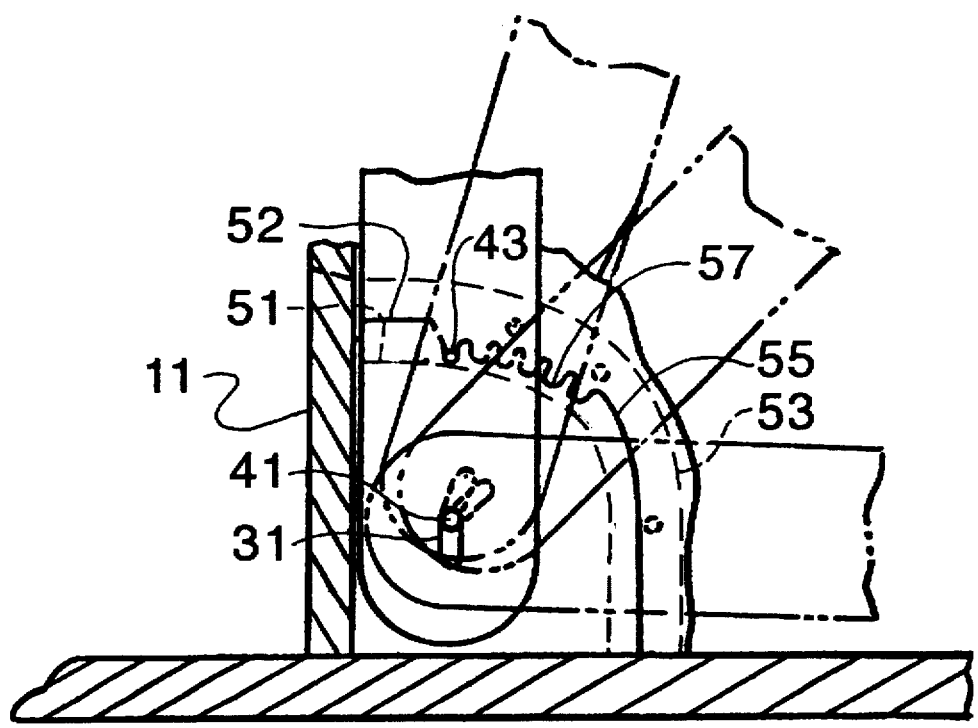
FIG. 4 is a sectional view taken along 4—4 of FIG. 1 illustrating additional details as seen in phantom.
Figure 5A:
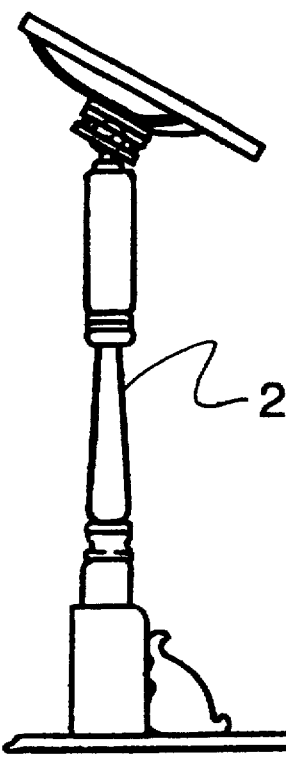
FIG. 5A is a side elevation illustrating an embodiment of the invention in an upright position carrying an article in a tilted presentation.
Figure 5B:
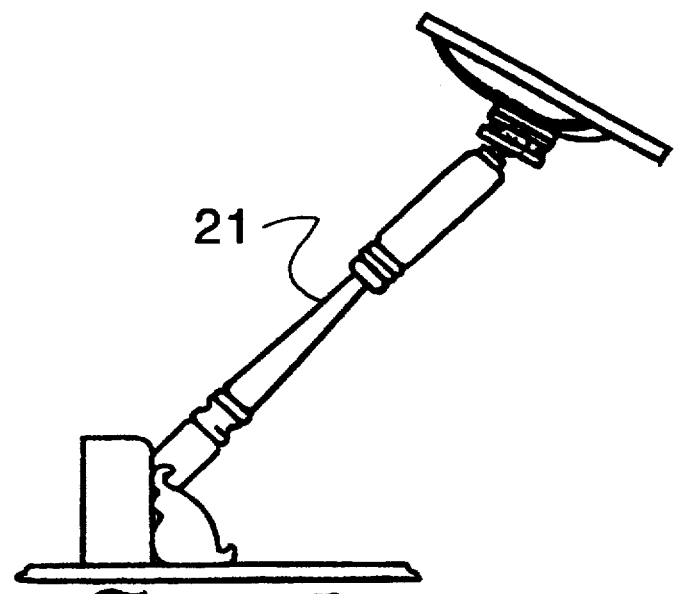
FIG. 5B is a view similar to 5A showing the invention in an intermediate inclined position.

As seen in FIG. 4, the each end of pin 43 is positioned to engage an arcuate surface 55 of a metal plate 51 as well as a series of notches 57 defined by the arcuate surface 55 of metal plate 51. Plates 51 are positioned along an inner wall surface of wall 7 and wall 9. The pin 43 and notch 57 arrangement permits the step-wise tilting of upright 21 as seen in FIGS. 5A and 5B.

In operation, when upright 21 is raised in a direction along its axis, notch 31 permits the upright to be slightly displaced. At the displaced position, the upright can be freely moved about an arc from the upright position to a flat folded position relative to the base. The upright can be locked in certain positions by the insertion of pin 43 ends within any of the defined notches of the side plates. A stop 52 is provided by a portion of each plate 51 to prevent the upright from engaging boot back 11.

As seen in reference to FIG. 4, the notches and arcuate surface of the side plates are opposite a recessed groove 53 or routered portion of the interior sideboards. While not essential, the defined space permits the locking pin ends to slightly overlap the notches and arcuate edges for easier locking and simplified assembly. The groove permits the ends of pin 43 to freely move from one notch position to another as well as along an arcuate edge of the side plate.

As seen in the preferred embodiment, it is desirable to have the anchor pin 41 further traverse the metal side plate prior to entering an attachment aperture. The metal-to-metal contact is stronger and longer lasting. A similar metal-to-metal interaction between the pin 43 and the notches of the baseplate is desired for long-term wear and reliability. However, a similar function could be provided by using a series of grooves and notches defined within respective wooden sideboards 7 and 9.

A free end of upright 21 defines a terminal wooden ball 71. Positioned against a lower hemisphere of ball 71 is a first wooden frame 61 having a central aperture with a diameter slightly less than the diameter of wooden ball 71. Frame 61 is held in position against the lower hemisphere of ball 71 by an upper frame 63 which partially engages through its own defined aperture an upper hemisphere portion of ball 71. A plurality of spaced connectors maintain the relative spacing between frame 61 and frame 63. One of the connectors is provided with a finger bolt 65 to vary the tension between the frames and thereby control the rotational ease in which attached frames 61 and 63 engage ball 71.

Figure 2:
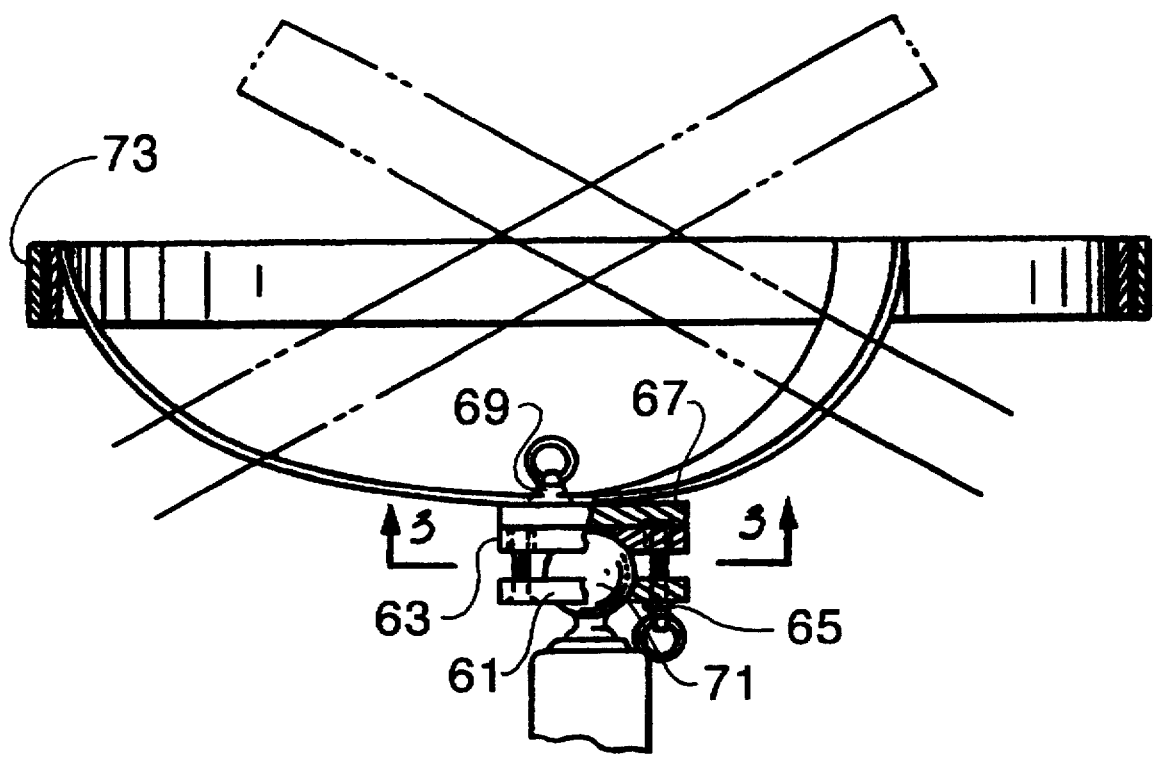
FIG. 2 is a sectional view taken along line 2—2 of FIG. 1.
Figure 3:
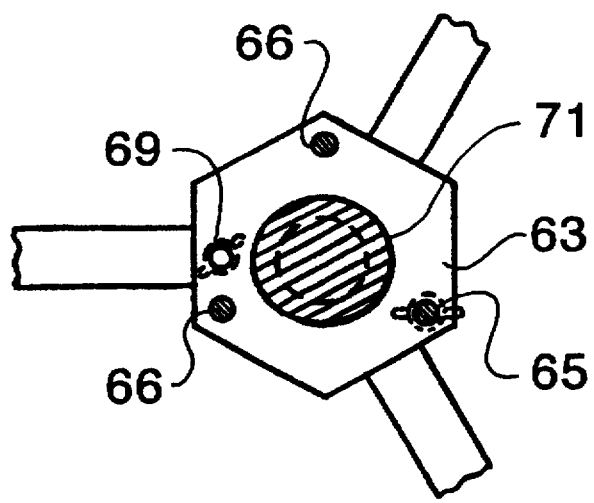
FIG. 3 is a sectional view taken along line 3—3 of FIG. 2.

An upper surface of frame 63 further provides one or more projections 66 which are designed to engage and mate with a correspondingly shaped base 67. For aesthetics and economy of construction, it is preferred that base 67 have a similar shape and dimensions to that of frame 63, however, any shaped base which can be secured to frame 67 and/or 63 can achieve similar movements and operation. A second threaded bolt 69 is used to secure base 67 to frame 63. As seen in reference to FIGS. 1 and 2, a quilting hoop 73 defining a series of support braces is carried by base 67. When secured to the stand, the hoop is free to rotate in either a clockwise or counterclockwise direction along with the interconnected frames 61 and 63 as well as accompanying base 67. Further, the plane of the hoop can be simultaneously varied about the ball 71 to better position a quilting hoop or similar article.

Yet an additional adjustment to the stand is also controllable through engaging the hoop. Upright 21 can be pivoted from an upright locked position as seen in FIG. 5A, to one of several inclined, locking positions such as that seen in FIG. 5B. The upward displacement of upright 21 is controllable through the engagement of the hoop. A slight lifting action along the axis of upright 21, displaces the upright relative to anchor pin 41 a fixed distance as provided by notch 31. The upward displacement releases locking pin ends 43 from the upright notch position. Maintaining a slight upward force through the hoop allows the upright to be repositioned opposite any of the intermediate notches or fully reclined into a substantially flat storage position against base 3. Releasing the upright will allow the locking pins to once again engage the respective notches or arcuate surface.

For crafts such as quilting, the quilter is typically seated. Much of base 3 is positioned underneath the user's seat, with the quilter's feet resting on the base for further support. The hoop portion can be adjusted to simultaneously rotate, tilt, and vary the position of the upright and the angle of the hoop and enclosed quilt portion. The ability to recline the upright toward a seated user is helpful to vary the height and position and thereby avoid fatigue as well as accommodate different height chairs as well as different users.

Other articles carried by the stand operate in a similar fashion. Advantages of the present invention enable the user to incline the stand without any outward mechanical adjustment of a set screw or other type release. The pivoting base feature is controllable through forces applied along the upper portion of the stand: no bending or kneeling is required to engage or disengage the pivot portion of the base. Independent of the base, the article, such as a quilting hoop, can be rotated and repositioned relative to a ball joint integral with the stand. Again, once the ball joint and any carried article is in place, rotational and planer adjustments of the article require no release or disengagement of any mechanical securing means. Rather, a preset tension allows the movement of the article relative to the ball. Accordingly, the present invention provides a stand in which a user can varying the height of the stand through a tilting/pivot attachment of an upright to a lower base and which is controllable through the engagement of an upper carried article. These features are not present in prior art stands and afford many advantages in terms of ease of use and versatility.

That which is claimed:

1. An adjustable stand comprising:

a boot defining a three-sided receptacle and carried by an upper surface of a base, said boot further defining a first sidewall, a second sidewall, and a back, said back connecting said first sidewall to said second sidewall;

a first plate attached to an inner surface of said first sidewall, said first plate defining a series of notches along a portion of an arcuate edge of said plate;

a second plate attached to an inner surface of said second sidewall, said second plate defining the series of notches along a portion of an arcuate edge of said second plate;

an upright, one portion of which is carried within said receptacle by an anchor traversing said upright through a chamber defined by a terminal portion of said upright, each end of said anchor mounted within said receptacle, said chamber having a height dimension along a vertical axis of said upright, said height dimension greater than a diameter of said anchor;

a locking pin traversing said upright at a position above said anchor, a first end of said locking pin selectively engaging said notches and an arcuate surface of said first plate and a second end of said locking pin selectively engaging said notches and said arcuate surface of said second plate;

a terminal ball carried on a free end of said upright;

a first frame defining a circular aperture therethrough, said aperture having a diameter less than the diameter of said terminal ball, said frame in communication through said aperture with a lower hemisphere of said ball;

a second frame defining an aperture therethrough and carried by an upper surface of said first frame by a plurality of spaced connectors, said second frame aperture being in communication with a portion of an upper hemisphere of said ball;

an article having a base engaging a surface of said second frame, said article base further defining a securing member for attaching said base to said second frame.

2. An adjustable stand comprising:

a boot defining a three-sided receptacle carried by an upper surface of a base, said boot further defining a first sidewall, a second sidewall, and a back, said back connecting said first sidewall to said second sidewall;

a first plate attached to an inner surface of said first sidewall, said first plate defining a series of notches along a portion of an arcuate edge of said plate, said arcuate edge and said notches opposite a groove defined by an inner surface of said first sidewall;

a second plate attached to an inner surface of said second sidewall, said second plate defining the series of notches along a portion of an arcuate edge of said second plate, said arcuate edge and said notches opposite a groove defined by an inner surface of said second sidewall;

an upright defining a rectangular post of a first end, said post carried within said receptacle by an anchor traversing said post through a chamber defined by said post, each end of said anchor mounted within a respective bore defined by an interior wall of each said sidewall, said chamber having a height dimension along a vertical axis of said upright, said height dimension greater than a diameter of said anchor;

a locking pin traversing said post at a position above said anchor, a first end of said locking pin selectively engaging said notches and said arcuate surface of said first plate and a second end of said locking pin selectively engaging said notches and an arcuate surface of said second plate;

a terminal ball carried on a free end of said upright;

a first frame defining a circular aperture therethrough, said aperture less than the diameter of said terminal ball and said aperture in communication with a lower hemisphere of said ball;

a second frame defining an aperture therethrough, said aperture having a diameter less than said aperture of said first frame and carried by an upper surface of said first frame by a plurality of spaced connectors, said second frame aperture being in communication with a portion of an upper hemisphere of said ball;

an article having a mated base and engaging a surface of said second frame, said article base further defining a securing member for attaching said mated base to said second frame.

3. The apparatus according to claim 1 wherein said article is a quilting hoop.

4. A process of adjusting an article carried by a stand comprising:

providing a stand having a base and an upright, said upright carried within a boot having a pair of sidewalls on said base;

lifting along an axis of said upright;

displacing said upright from an anchor attaching said upright to said boot, said displacement further releasing said upright from a locked position;

moving said upright within said boot to an adjusted position;

inserting said upright into a new locked position;

varying a position of an article carried by said stand by the movement of said article about a ball joint defined by said stand.

5. The process according to claim 4 wherein said lifting is provided by a force applied to said article carried by said stand.

6. The process according to claim 4 wherein said lifting step and said varying step occur simultaneously.

* * * * *